(12) United States Patent
Gao et al.

(10) Patent No.: US 9,726,410 B2
(45) Date of Patent: Aug. 8, 2017

(54) PORTABLE REFRIGERANT CHARGE METER AND METHOD FOR DETERMINING THE ACTUAL REFRIGERANT CHARGE IN HVAC SYSTEMS

(71) Applicant: UT-Battelle, LLC, Oak Ridge, TN (US)

(72) Inventors: Zhiming Gao, Knoxville, TN (US); Omar Abdelaziz, Knoxville, TN (US); Tim L. LaClair, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 143 days.

(21) Appl. No.: 14/828,595

(22) Filed: Aug. 18, 2015

(65) Prior Publication Data

US 2017/0051958 A1    Feb. 23, 2017

(51) Int. Cl.
  *F25B 49/00*  (2006.01)
  *G01F 23/22*  (2006.01)

(52) U.S. Cl.
  CPC ............ *F25B 49/005* (2013.01); *G01F 23/22* (2013.01); *F25B 2500/19* (2013.01); *F25B 2500/24* (2013.01); *F25B 2700/21163* (2013.01)

(58) Field of Classification Search
  CPC ........ F25B 49/005; F25B 49/00; F25B 49/02; F25B 49/022; F25B 49/025; F25B 49/027; F25B 49/043; F25B 41/006; F25B 2345/001; F25B 2345/007; F25B 2345/002; F25B 2345/004; F25B 2345/006; F25B 2345/0052; G01F 23/22; G01F 23/14; G01F 25/00
  USPC .......................................................... 62/149
  See application file for complete search history.

(56) References Cited

U.S. PATENT DOCUMENTS

| | | | |
|---|---|---|---|
| 5,802,859 A * | 9/1998 | Zugibe .................... | F25B 45/00 62/125 |
| 6,868,678 B2 | 3/2005 | Mei et al. | |
| 7,159,408 B2 | 1/2007 | Sadegh et al. | |
| 7,188,482 B2 | 3/2007 | Sadegh et al. | |
| 7,631,508 B2 | 12/2009 | Braun et al. | |
| 2005/0262855 A1 * | 12/2005 | Hsieh ................. | B60H 1/00585 62/126 |
| 2006/0137366 A1 * | 6/2006 | Kang ...................... | F25B 45/00 62/149 |
| 2007/0125102 A1 * | 6/2007 | Concha .............. | B60H 1/00978 62/149 |
| 2009/0049857 A1 * | 2/2009 | Murakami .............. | F25B 13/00 62/324.6 |
| 2010/0072946 A1 * | 3/2010 | Sugano ................. | B60L 3/0046 320/108 |
| 2010/0088046 A1 * | 4/2010 | Schuster ............... | F25B 49/005 702/50 |

(Continued)

*Primary Examiner* — Mohammad M Ali
(74) *Attorney, Agent, or Firm* — Colin L. Cini

(57) ABSTRACT

A refrigerant charge meter and a method for determining the actual refrigerant charge in HVAC systems are described. The meter includes means for determining an optimum refrigerant charge from system subcooling and system component parameters. The meter also includes means for determining the ratio of the actual refrigerant charge to the optimum refrigerant charge. Finally, the meter includes means for determining the actual refrigerant charge from the optimum refrigerant charge and the ratio of the actual refrigerant charge to the optimum refrigerant charge.

8 Claims, 6 Drawing Sheets

(56) References Cited

U.S. PATENT DOCUMENTS

| | | | |
|---|---|---|---|
| 2010/0089076 A1* | 4/2010 | Schuster | F25B 49/005 62/77 |
| 2011/0144807 A1* | 6/2011 | Buda | F25B 49/005 700/275 |
| 2011/0247350 A1* | 10/2011 | Awwad | F25B 27/00 62/115 |
| 2011/0266996 A1* | 11/2011 | Sugano | B60L 3/003 320/104 |
| 2013/0008192 A1* | 1/2013 | McMasters | F25B 45/00 62/77 |
| 2013/0061615 A1* | 3/2013 | Omer | F24F 13/222 62/82 |
| 2013/0160470 A1* | 6/2013 | Schuster | F25B 45/00 62/77 |
| 2013/0285822 A1* | 10/2013 | Gado | G08B 21/182 340/614 |

* cited by examiner

PORTABLE REFRIGERANT CHARGE METER AND METHOD FOR DETERMINING THE ACTUAL REFRIGERANT CHARGE IN HVAC SYSTEMS

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

CROSS-REFERENCE TO RELATED APPLICATIONS

None.

THE NAMES OF THE PARTIES TO A JOINT RESEARCH AGREEMENT

None.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

None.

STATEMENT REGARDING PRIOR DISCLOSURES BY THE INVENTOR OR A JOINT INVENTOR

None.

BACKGROUND OF THE INVENTION

1. Field of the Invention

The present description relates to heating, ventilation, and air conditioning (HVAC) systems and more specifically to a portable refrigerant charge meter and method for measuring refrigerant charge level in such systems without the need for complex connections to the fluid lines. The disclosure is applicable to both conventional air conditioning and heat pump systems.

2. Description of the Related Art

One of the main issues affecting HVAC systems in residential house and light commercial building is improper refrigerant charge. Fifty to eighty percent of residential air conditioning and heat pump systems operate in under or overcharged states. In most cases, the systems become undercharged as a result of a slow refrigerant leak. This directly results in the air conditioning or heat pump system operating outside of its designed efficiency and it can consume considerably more electrical energy as a result. Observations have shown that typical levels of undercharging in HVAC systems can produce efficiency losses of thirty percent. However, most system owners do not realize that their HVAC systems are not working properly until a large percentage of the refrigerant has leaked out and the cooling effectiveness becomes noticeable. It can even be difficult for certified HVAC technicians to troubleshoot how much refrigerant charge exists in an improperly charged system since simple, fast, and accurate diagnostic devices do not currently exist.

Traditional refrigerant leak detection technologies include corona discharge, heated diode, and ultra violet (UV) based systems. These technologies are only used for sensing and monitoring refrigerant leaks, but they are not able to quantify the amount of refrigerant charge remaining in the air conditioner and heat pump systems. There are other refrigerant charge diagnostic technologies that require intrusion into the HVAC system to measure the refrigerant high-side and low-side pressures. Once the pressures are known, the high or low refrigerant charge level can be estimated based on the technician's experience and/or equipment manual, but the ability to accurately measure the actual quantity of refrigerant charge is limited. Thus, a simple refrigerant charge diagnostic meter that can quickly and accurately determine the refrigerant charge level in an HVAC system is required.

BRIEF SUMMARY OF THE INVENTION

Disclosed are several examples of devices and methods for determining the actual refrigerant charge in HVAC system.

The following summary is provided to facilitate an understanding of some of the innovative features unique to the embodiments and is not intended to be a full description. A full appreciation of the various aspects of the embodiments disclosed can be gained by taking the entire specification, drawings, claims, and abstract as a whole.

A refrigerant charge meter and a method for determining the actual refrigerant charge in HVAC systems are described. The meter includes means for determining an optimum refrigerant charge from system subcooling and system component parameters. The meter also includes means for determining the ratio of the actual refrigerant charge to the optimum refrigerant charge. Finally, the meter includes means for determining the actual refrigerant charge from the optimum refrigerant charge and the ratio of the actual refrigerant charge to the optimum refrigerant charge. Other aspects are described in detail below.

BRIEF DESCRIPTION OF THE SEVERAL VIEWS OF THE DRAWING(S)

The device and method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF THE INVENTION

With regard to all such embodiments as may be herein described and contemplated, it will be appreciated that optional features, including, but not limited to, aesthetically pleasing coloration and surface design, and labeling and brand marking, may be provided in association with the product design, all without departing from the scope of the invention.

Figure 1:
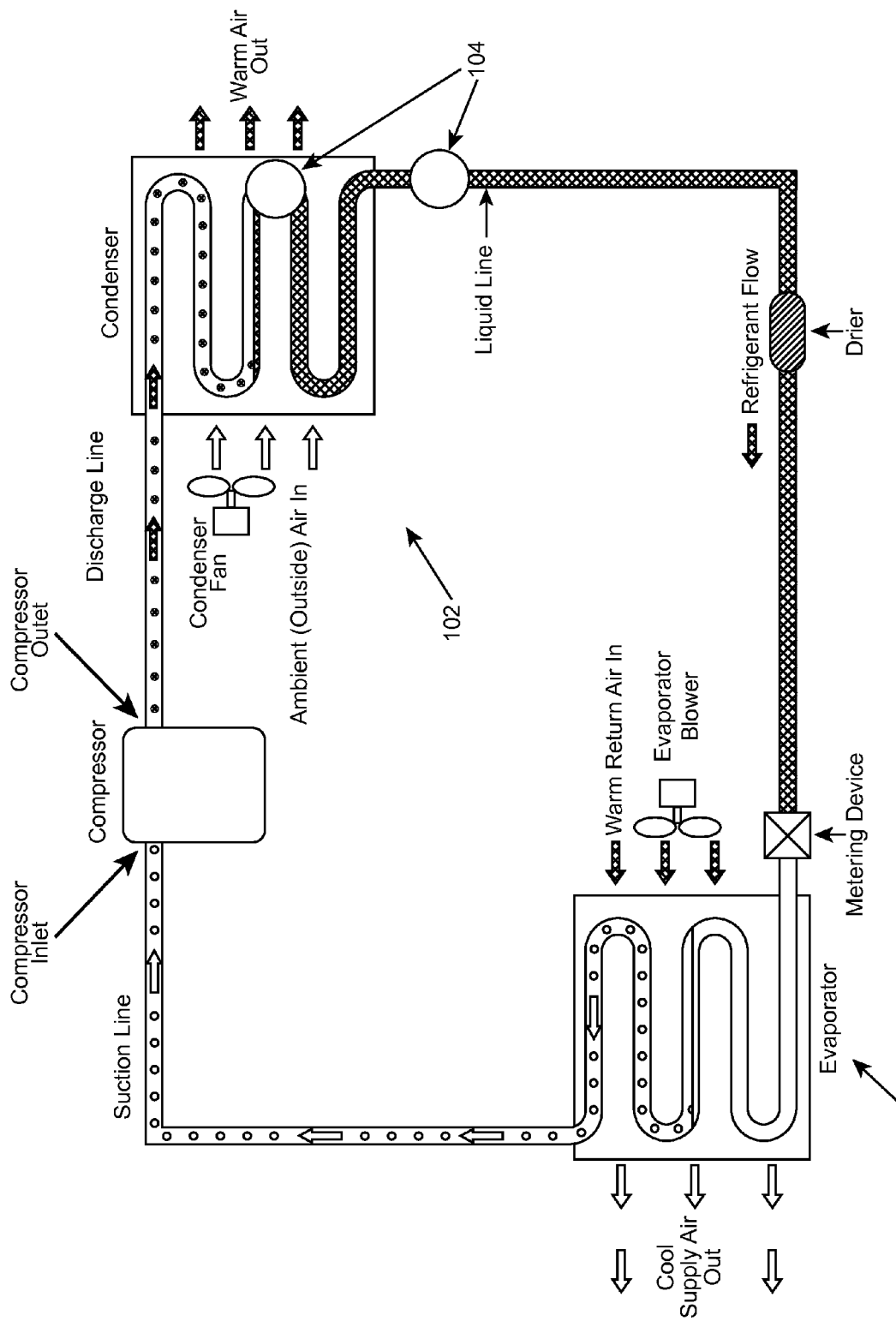
FIG. 1 is a simplified schematic illustration of a conventional air conditioning HVAC system with diagnostic locations indicated.
Figure 2:
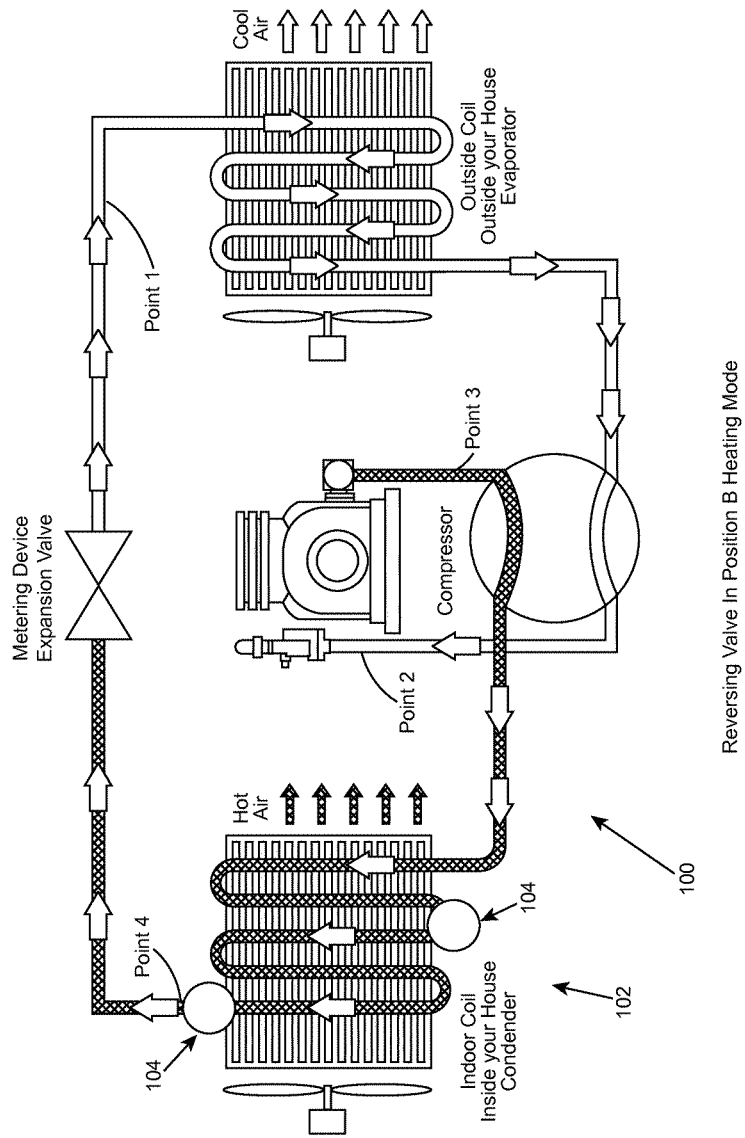
FIG. 2 is a simplified schematic of a typical heat pump HVAC system in heating mode and with diagnostic locations indicated.
Figure 3:
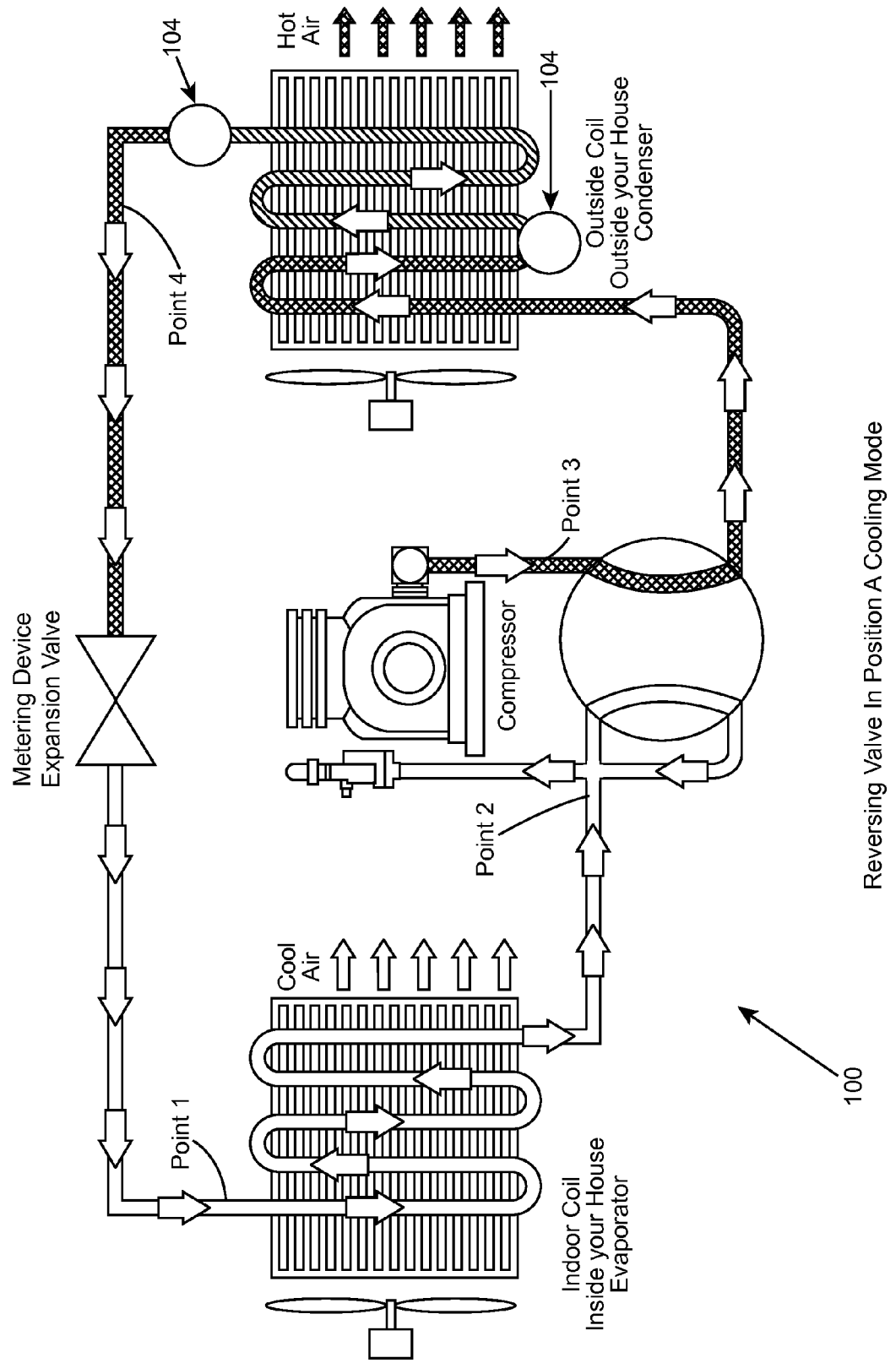
FIG. 3 is a simplified schematic of the system of FIG. 2 in cooling mode and with diagnostic locations indicated.

FIGS. 1-3 are simplified schematics of a conventional air conditioner system, a heat pump system in heating mode, and a heat pump system in cooling mode respectively. Since these HVAC systems 100 are well known in the industry, their individual components and operations will not be described here. With respect to each of the systems 100, subcooling is defined as a liquid refrigerant existing at a temperature below its saturation temperature. The amount of subcooling, at a given condition, is the difference between its saturation temperature and the actual liquid refrigerant temperature. The amount of subcooling is determined by the refrigerant temperature drop at the condenser coil 102.

A first thermocouple 104 measures the temperature in the middle of the condenser coil 102. This temperature is referred to the saturation temperature at the point of the condenser coil 102 where both refrigerant vapor and refrigerant liquid exist in equilibrium. A second thermocouple 104 measures the liquid phase temperature of the refrigerant exiting the condenser coil 104. In some examples, separate thermocouples 104 are used to measure the temperatures in parallel and, in other examples, a single thermocouple 104 may be used to measure the temperatures at the two sites in series. For example, if the saturation temperature is 110° F. (316 K) and the exit temperature is 100° F. (311 K), the subcooling temperature is 10° F. (5 K).

Figure 4:
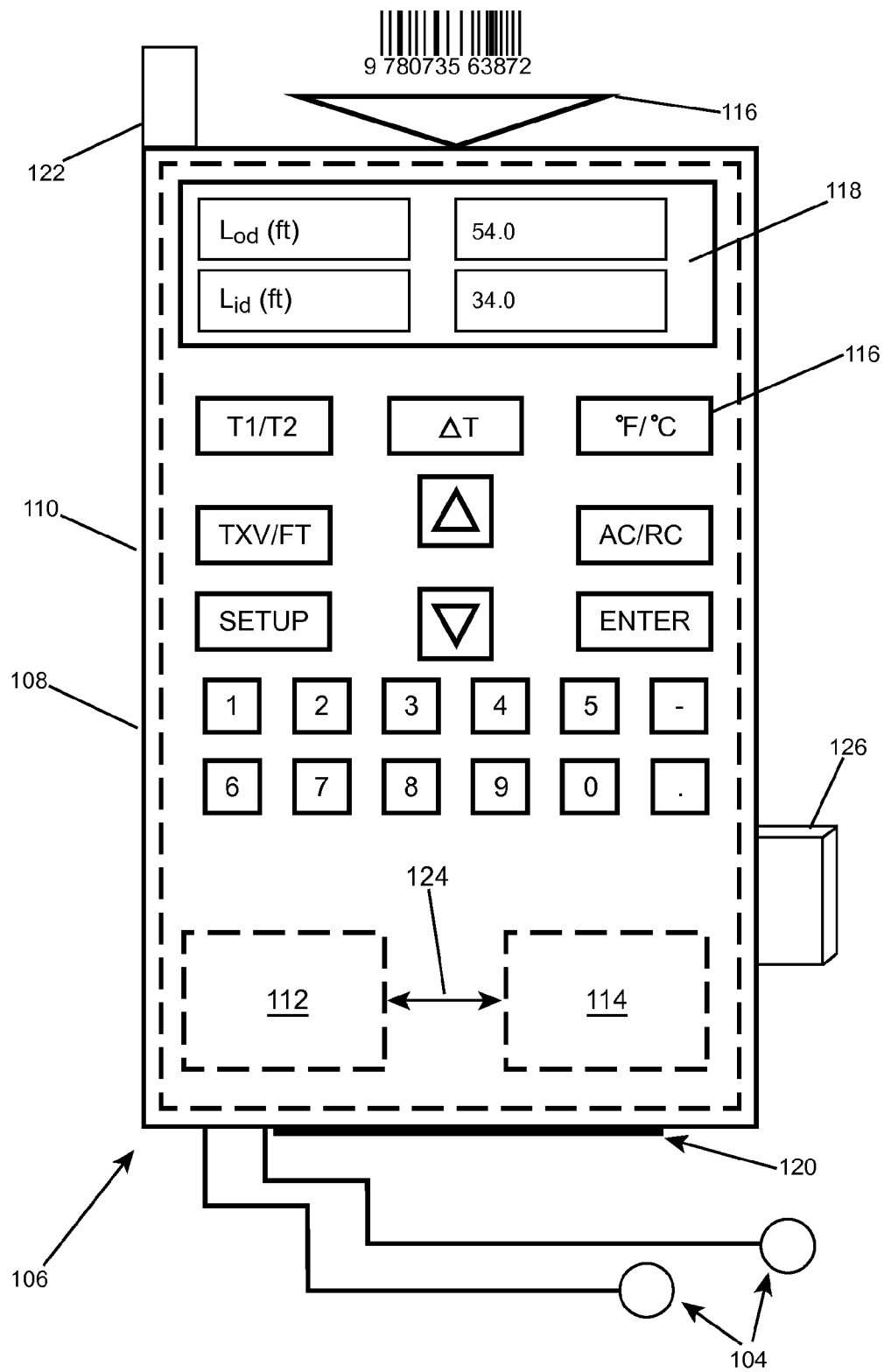
FIG. 4 is a simplified schematic illustration of an example of a refrigerant charge meter.

Referring now to FIG. 4, a simplified schematic illustration of an example of a portable refrigerant charge meter 106 is shown. Here, a housing 108 encases a computing device 110. The computing device 110 broadly comprises one or more processing devices 112, one or more memory devices 114, one or more input devices 116 and one or more display devices 118. The processing devices 112 execute computer-executable instructions that are preprogrammed or programmed in-situ. A processing device 112 can be a general-purpose central processing unit (CPU), processor in an application-specific integrated circuit (ASIC) or any other type of processor. In some examples, a field programmable gate array (FPGA) may be used as a processor. In a multi-processing system, multiple processing devices 112 execute computer-executable instructions to increase processing power. For example, a central processing device as well as a graphics processing device or co-processing device may be used. The tangible memory device 114 may be volatile memory (e.g., registers, cache, RAM), non-volatile memory (e.g., ROM, EEPROM, flash memory, etc.), or some combination of the two, accessible by the processing devices. The memory device stores software implementing one or more innovations described herein, in the form of computer-executable instructions suitable for execution by the processing devices.

The computing device 110 may have additional features as well. For example, the computing device may have one or more output devices 120, and one or more communication connections 122. An interconnection mechanism 124 such as a bus, controller, or network interconnects the components of the computing system. Typically, operating system software provides an operating environment for other software executing in the computing system, and coordinates activities of the various components of the computing system.

A tangible storage 126 may be removable or non-removable, and includes magnetic disks, magnetic tapes or cassettes, CD-ROMs, DVDs, SDs, or any other medium which can be used to store information in a non-transitory way and which can be accessed within the computing system. The storage 126 houses instructions for the software implementing one or more innovations described herein.

The input device(s) 116 may be a touch input device such as a keyboard, touch screen, mouse, pen, or trackball, a voice input device, an optical scanning device such as a barcode reader or QR Code reader, or another device that provides input to the computing device 110. The output device(s) 120 may be a display, printer, speaker, CD-writer, or another device that provides output from the computing device 110.

The exemplary input device 116 of FIG. 4 will now be described in greater detail. The button of T1/T2 is used to show the measured temperature in the display device 118 via thermocouple devices 104. The button of $\Delta T$ is used to show the measured temperature difference (e.g. subcooling) in the display device 118 via thermocouple devices 104. The button of ° F./° C. is used to switch ° F. and ° C. degree. The button of TXV (thermostatic expansion valve)/FT (fixed tube) is used to input expansion device used in HVAC systems. The button of AC (actual refrigerant charge in unit of lb)/RC (relative refrigerant charge in unit of %) is used to show actual refrigerant charge or relative refrigerant charge in the HVAC system in the display device 118. The buttons of SETUP, ENTER, 0-9, ".", and "-" are used to input HVAC system parameters such as $L_{ID}$, $L_{OD}$, $L_{LL}$, $D_{ID}$, $D_{OD}$, $D_{LL}$, as well as selecting refrigerant type and cycle mode (i.e. heating or cooling) in the display device 118. The SETUP button shows a window in the display device 118. The $\Delta$ and $\nabla$ buttons are used to move the window up or down for parameter inputs and selecting. The 0-9, "." buttons are used to enter the parameters into their proper fields. The ENTER button is used to end the parameters input and selecting refrigerant type and cycle mode. While this describes the specific input device 116 of FIG. 4, other button layouts are contemplated.

The communication connection(s) 122 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing device on a target real or virtual processor. Generally, program modules include routines, programs, libraries, objects, classes, components, data structures, look-up tables, etc. that perform particular tasks or implement particular data types. The functionality of the program modules may be combined or split between program modules as desired in various embodiments. Computer-executable instructions for program modules may be executed within a local or distributed computing system.

For the sake of this disclosure, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation. The ten is "determining" and "calculating" may be interchanged when used in describing the computational devices and methods.

In one example environment, the cloud provides services for connected devices with a variety of screen capabilities. A connected device represents a device with a computer screen. For example, a connected device could be a personal computer such as desktop computer, laptop, notebook, netbook, or the like. Connected device represents a device with a mobile device screen (e.g., a small-size screen). For example, connected device could be a mobile phone, smart phone, personal digital assistant, tablet computer, and the like. Connected device represents a device with a large screen. For example, connected device could be a television screen (e.g., a smart television) or another device connected to a television (e.g., a set-top box or gaming console) or the like. One or more of the connected devices can include touch screen capabilities. Touchscreens can accept input as an input device in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment. For example, the cloud can provide services for one or more computers (e.g., server computers) without displays.

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Figure 5:
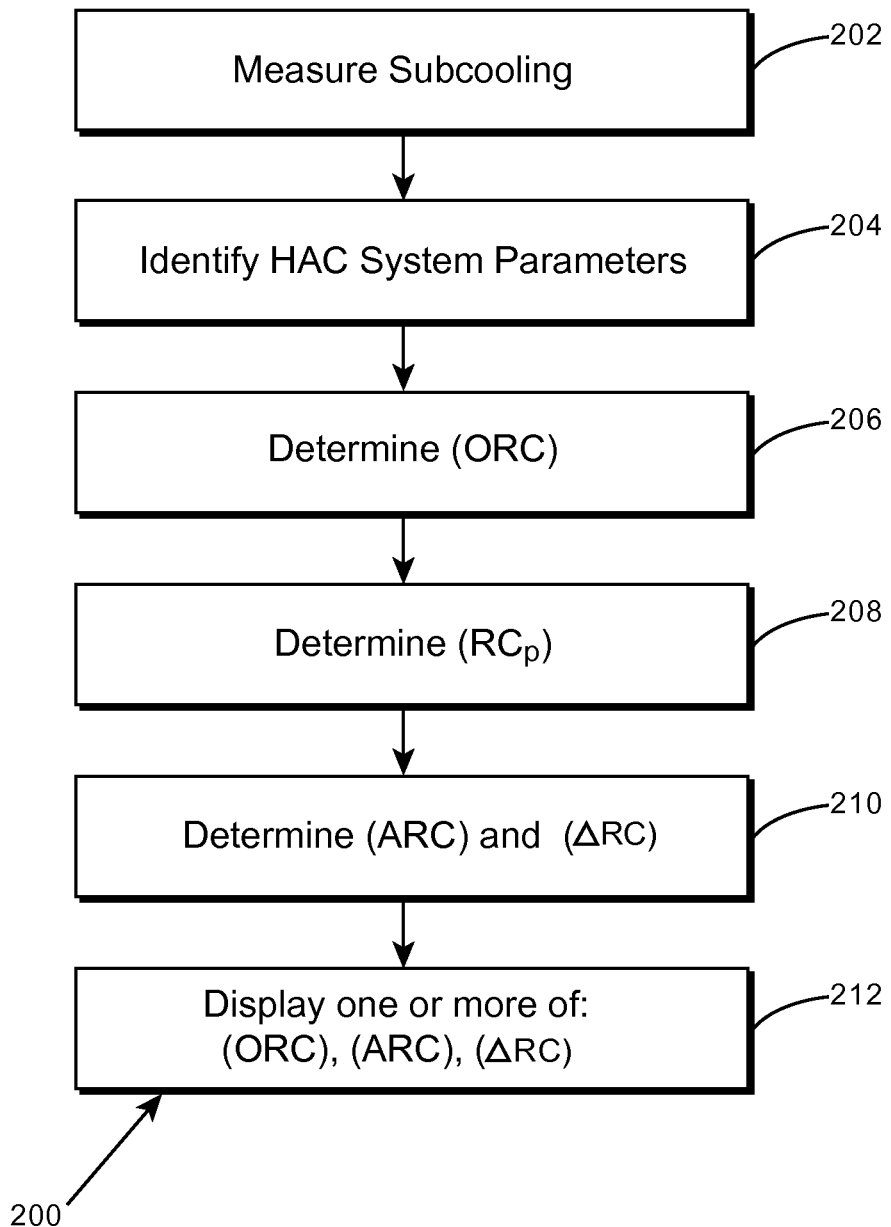
FIG. 5 is a block diagram of an example of method steps for determining the actual refrigerant charge in HVAC Systems using the meter of FIG. 4.

An exemplary method 200 for determining the actual refrigerant charge in HVAC systems will now be described in detail with reference to FIG. 5. As mentioned earlier above, the subcooling of the system is determined in step 202 by measuring the temperatures at a mid-point and an exit point of the condenser coil 102 with one or more thermocouples 104. The temperatures at each point may be measured in degrees Fahrenheit and then converted to degrees Kelvin using $T_K=(T_F+459.67)\times 5/9$. The thermocouples 104 may be connected directly to the refrigerant charge meter 106 and the temperature data automatically stored, or the temperature data may be entered manually using the input device 116. The processing device 112 includes means for determining subcooling temperature ($\Delta T_{SC}$) in Degrees Kelvin According to the equation $\Delta T_{SC}=T_1-T_2$, where $T_1$ is the temperature measured at the mid-point or medium-range temperature and $T_2$ is the temperature measured at the exit point of the condenser coil 102 as illustrated in FIGS. 1-3.

The specific parameters of the HVAC system 100 components being diagnosed are identified as represented by step 204. Here, the individual parameters may be entered manually using an input device 116 such as a keypad, or entered automatically using an optical input device such as a barcode or QR code scanner. In the latter example, a system component's model numbers may be scanned and the individual parameters may be retrieved from a look-up table stored in the memory device 114 or online, according to the system model and/or individual component model numbers. In some examples, a single model number may be associated with the entire HVAC system and in other examples more than one model number may be associated with individual HVAC system components.

The following HVAC system parameters are identified, entered and stored in the meter 106: the refrigerant type (R22) or (R410A) disposed in the system; the expansion device type (Thermal Expansion Device) or (Fixed Tube) disposed in the system; the cycle mode (Heating) or (Cooling) of the system; the outside diameter in inches of each of the outdoor heat exchanger unit tube ($D_{OD}$), the indoor heat exchanger unit tube ($D_{ID}$), and the liquid line tube ($D_{LL}$); the length in feet of each of the outdoor heat exchanger unit tube ($L_{OD}$), the indoor heat exchanger unit tube ($L_{ID}$), and the liquid line tube ($L_{LL}$).

When input manually, ($D_{OD}$), ($D_{ID}$), and ($D_{LL}$) can be measured directly from the system, and ($L_{OD}$), ($L_{ID}$), and ($L_{LL}$) can be estimated from a single tube length and multiplied by the number of tubes in the heat exchangers. A single tube length is measured directly from the indoor or outdoor condenser/evaporator heat exchangers, while the total number of tubes is calculated from the number of tubes per row and the number of rows. For example, a heat exchanger that is eighteen inches wide and having three rows of six tubes each will have a line length of approximately twenty-seven feet.

The processing device 112 also includes means for determining an optimum refrigerant charge value (ORC) in pounds as provided in step 206. The means uses the outdoor heat exchanger unit tube diameter ($D_{OD}$), the indoor heat exchanger unit tube diameter ($D_{ID}$), the liquid line tube diameter ($D_{LL}$), the outdoor heat exchanger unit tube length ($L_{OD}$), the indoor heat exchanger unit tube length ($L_{ID}$), and the liquid line tube length ($L_{LL}$) identified in step 204.

The means for determining an optimum refrigerant charge value (ORC) in pounds with the processing device 112 includes solving the equation ORC (lb)=$a_1 \times L_{OD} \times (D_{OD}-0.024)^2 + a_2 \times L_{ID} \times (D_{ID}-0.024)^2 + a_3 \times L_{LL} \times (D_{LL}-0.064)^2$ where coefficients $a_1$, $a_2$ and $a_3$ are selected from Table 1 below, according to the refrigerant type determined in step 204.

TABLE 1

| Refrigerant Type | $a_1$ | $a_2$ | $a_3$ |
| --- | --- | --- | --- |
| R22 | 0.1388 | 0.1242 | 0.3718 |
| R410A | 0.1573 | 0.1358 | 0.3184 |

The processing device 112 also includes means for determining the ratio ($RC_p$) of the actual refrigerant charge level (ARC) (lb) to the optimized refrigerant charge level (ORC) (lb) as provided in step 208.

The means for determining the ratio ($RC_p$) of the actual refrigerant charge level (ARC) (lb) to the optimized refrigerant charge level (ORC) (lb) with the processing device 112 includes solving the equation $(RC_p)=(ARC)/(ORC)=f_1 \times \Delta T^4_{SC}+f_2 \times \Delta T^3_{SC}+f_3 \times \Delta T^2_{SC}+f_4 \times \Delta T_{SC}+f_5$ where coefficients $f_1, f_2, f_3, f_4$ and $f_5$ are selected from Table 2 below, according to the expansion device type and the cycle mode determined in step 204, and ($\Delta T_{SC}$) determined in step 202.

TABLE 2

| Expansion Device | | $f_1$ | $f_2$ | $f_3$ | $f_4$ | $f_5$ |
|---|---|---|---|---|---|---|
| Thermal Expansion Valve | Heating | 7.0774e−5 | −1.5250e−3 | 1.3105e−2 | −1.7223e−2 | 0.10 |
| | Cooling | 5.1751e−4 | −8.2030e−3 | 3.3003e−2 | 7.0304e−2 | 0.10 |
| Fixed Tube | Heating | 2.4378e−8 | 3.7384e−5 | −2.5113e−3 | 6.9286e−2 | 0.10 |
| | Cooling | −4.9190e−4 | 1.3340e−2 | −1.2379e−1 | 4.8464e−1 | 0.10 |

The processing device 112 also includes means for determining the actual refrigerant charge level (ARC) (lb) in the system according to the equation ARC (lb)=$RC_p \times$ORC (lb) as provided in step 210. The processing device 112 also includes means for determining the mass of refrigerant that must be added to the system ($\Delta$RC) (lb) according to the equation $\Delta$RC (lb)=ORC(lb)−ARC(lb) as also provided in step 210. Note that each of the determining steps 202, 206-210 may be completed one time or multiple times in succession to determine when the proper refrigerant charge level is reached.

The display device 118 may optionally display one or more of the values of the actual refrigerant charge (ARC) (lb), the optimum refrigerant charge (ORC) (lb), or the refrigerant charge to be added ($\Delta$RC) (lb) as represented by step 212. In other examples, the actual refrigerant charge, the optimum refrigerant charge and the refrigerant charge to be added are stored in the memory device 114 or tangible storage device 126, or printed on an output device 120, or communicated to another device. The other device may be an offsite device connected through a wired or wireless network or a cloud environment 122.

Figure 6:
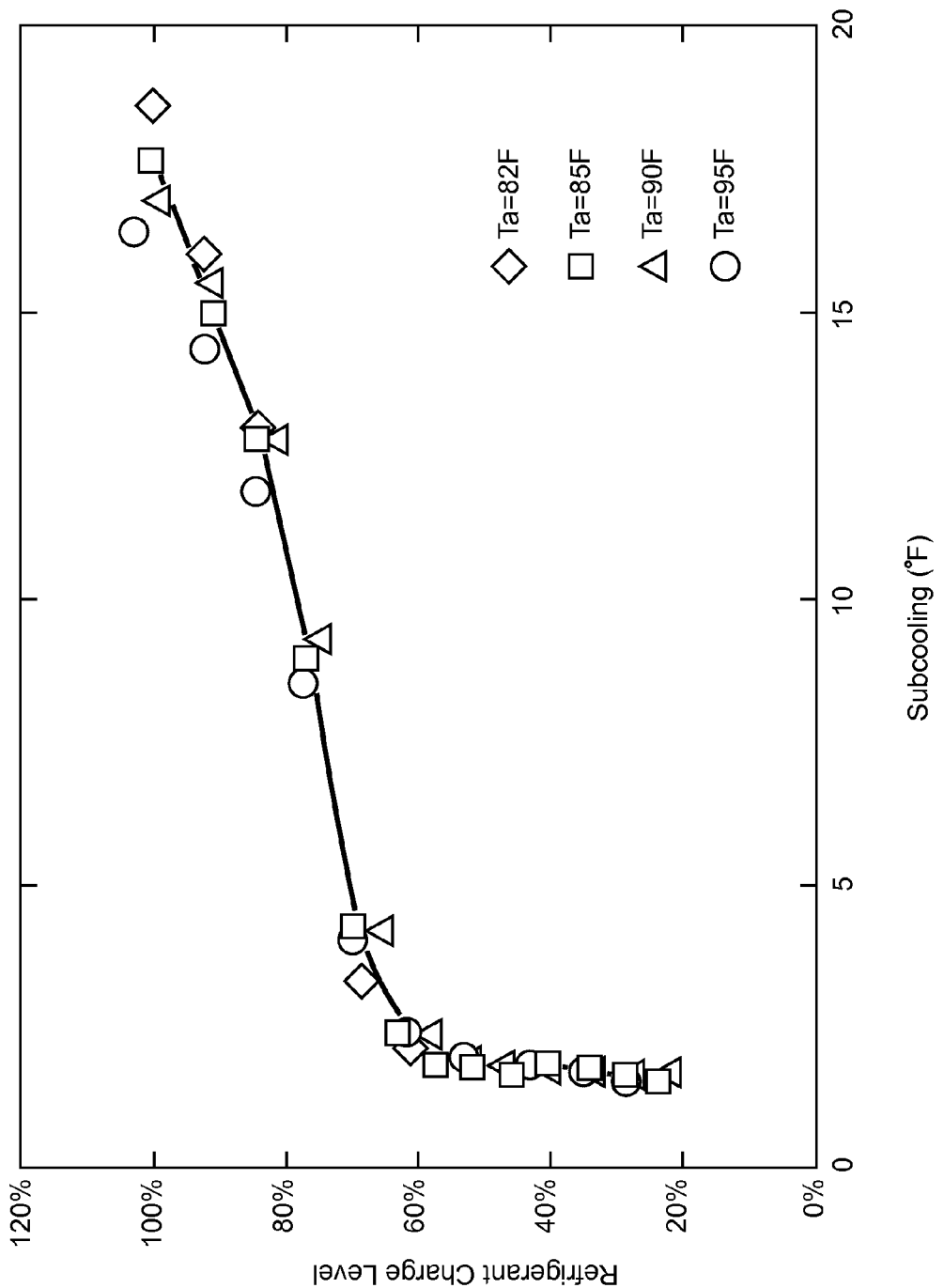
FIG. 6 is a graph illustrating the correlation between subcooling and refrigerant charge level at various ambient temperature conditions.

FIG. 6 is a graph illustrating the correlations between subcooling and refrigerant charge level at various ambient temperature conditions.

With the portable refrigerant charge meter 106 and method 200 for determining the actual refrigerant charge, a technician can confirm that a HVAC system is properly charged and operating efficiently. When the refrigerant is undercharged, the charge meter provides the value of the proper mass of refrigerant that must be added to achieve the optimum operating efficiency. The meter is portable, easy-to-use, and does not require intrusive and complex connections to the fluid lines to perform diagnostics. Benefits include an energy savings for the owner/operator of the system and a reduced diagnostic time for the technician.

While this disclosure describes and enables several examples of refrigerant charge meters and methods for determining the actual refrigerant charge in HVAC systems, other examples and applications are contemplated. Accordingly, the invention is intended to embrace those alternatives, modifications, equivalents, and variations as fall within the broad scope of the appended claims.

The technology disclosed and claimed herein may be available for licensing in specific fields of use by the assignee of record.

What is claimed is:

1. A method for determining the level of actual refrigerant charge in an HVAC system with a refrigerant charge meter, the method comprising the steps of:

a. measuring a first temperature ($T_1$) in degrees Kelvin at the point of the system's condenser coil where both refrigerant vapor and refrigerant liquid exist in equilibrium with a thermocouple of the refrigerant charge meter and storing the first temperature ($T_1$) in a memory device;

b. measuring a second temperature ($T_2$) in degrees Kelvin at an exit point of the condenser coil of the system with a thermocouple of the refrigerant charge meter and storing the second temperature ($T_2$) in a memory device of the refrigerant charge meter;

c. determining with a processing device of the refrigerant charge meter a subcooling temperature ($\Delta T_{SC}$) in degrees Kelvin according to the equation $\Delta T_{SC}=T_1-T_2$;

d. identifying a refrigerant type disposed in the system;

e. identifying an expansion device type disposed in the system;

f. identifying a cycle mode of the system;

g. identifying an outside diameter in inches of each of an outdoor heat exchanger unit tube ($D_{OD}$), an indoor heat exchanger unit tube ($D_{ID}$), and a liquid line tube ($D_{LL}$);

h. identifying a length in feet of each of an outdoor heat exchanger unit tube ($L_{OD}$), an indoor heat exchanger unit tube ($L_{ID}$), and a liquid line tube ($L_{LL}$);

i. entering with an input device of the refrigerant charge meter and storing into the memory device of the refrigerant charge meter the refrigerant type, the expansion device type, the cycle mode, the outdoor heat exchanger unit tube diameter ($D_{OD}$), the indoor heat exchanger unit tube diameter ($D_{ID}$), the liquid line tube diameter ($D_{LL}$), the outdoor heat exchanger unit tube length ($L_{OD}$), the indoor heat exchanger unit tube length ($L_{ID}$), and the liquid line tube length ($L_{LL}$);

j. determining with the processing device of the refrigerant charge meter an optimum refrigerant charge value (ORC) in pounds from the outdoor heat exchanger unit tube diameter ($D_{OD}$), the indoor heat exchanger unit tube diameter ($D_{ID}$), the liquid line tube diameter ($D_{LL}$), the outdoor heat exchanger unit tube length ($L_{OD}$), the indoor heat exchanger unit tube length ($L_{ID}$), and the liquid line tube length ($L_{LL}$) according to the equation ORC (lb)=$a_1 \times L_{OD} \times (D_{OD}-0.024)^2+a_2 \times L_{ID} \times (D_{ID}-0.024)^2+a_3 \times L_{LL} \times (D_{LL}-0.064)^2$ where coefficients $a_1, a_2$ and $a_3$ are selected from Table 1, according to the refrigerant type entered in step i above;

k. determining with the processing device of the refrigerant charge meter the ratio ($RC_p$) of the actual refrigerant charge level (ARC) (lb) to the optimized refrigerant charge level (ORC) (lb) according to the equation $(RC_p)=(ARC)/(ORC)=f_1\times\Delta T^4_{SC}+f_2\times\Delta T^3_{SC}+f_3\times\Delta T^2_{SC}+f_4\times\Delta T_{SC}+f_5$ where coefficients $f_1$, $f_2$, $f_3$, $f_4$ and $f_5$ are selected from Table 2, according to the expansion device type entered in step i above, the cycle mode entered in step i above, and ($\Delta T_{SC}$) calculated in step c above;

l. determining with the processing device of the refrigerant charge meter the actual refrigerant charge level (ARC) (lb) in the system according to the equation ARC (lb)=$RC_p\times$ORC (lb);

m. determining with the processing device of the refrigerant charge meter the amount of refrigerant charge to add ($\Delta$RC) (lb) according to the equation $\Delta$RC (lb)= ORC(lb)−ARC (lb);

n. displaying one or more of the actual refrigerant charge level (ARC) (lb), the optimum refrigerant charge level (ORC)(lb) and the refrigerant charge to be added ($\Delta$RC) (lb) with a display device of the refrigerant charge meter.

2. The method of claim 1 wherein the entering and storing step (i) is performed manually with the input device of the refrigerant charge meter.

3. The method of claim 2 wherein the entering and storing step (i) is performed manually by entering a model number with the input device of the refrigerant charge meter and locating data in a look-up table stored in the memory device of the refrigerant charge meter or online that is associated with the model number.

4. The method of claim 1 wherein the entering and storing step (i) is performed automatically by scanning a system model number code with the input device of the refrigerant charge meter and locating data in a look-up table stored in the memory device of the refrigerant charge meter or online that is associated with the system model number code.

5. The method of claim 4 wherein the entering and storing step (i) includes automatically scanning a component model number code with the input device of the refrigerant charge meter and locating data in a look-up table stored in the memory device of the refrigerant charge meter or an online look-up table that is associated with the component model number code.

6. The method of claim 1 wherein the thermocouples of the refrigerant charge meter of steps (a) and (b) are separate devices.

7. The method of claim 1 wherein the measuring steps (a, b), determining steps (c, j, k, l, m), and the displaying step (n) are all repeated until a full actual refrigerant charge level (ARC) (lb) is attained for the system.

8. An apparatus for determining the actual level of a refrigerant charge in an HVAC system, the apparatus comprising:

an input device for entering a first temperature ($T_1$) in degrees Kelvin measured at the point of the HVAC system's condenser coil where both refrigerant vapor and refrigerant liquid exist in equilibrium, a second temperature ($T_2$) in degrees Kelvin measured at an exit point of the condenser coil of the HVAC system, a refrigerant type, an expansion device type, a cycle mode, an outdoor heat exchanger unit tube diameter ($D_{OD}$), an indoor heat exchanger unit tube diameter ($D_{ID}$), a liquid line tube diameter ($D_{LL}$), an outdoor heat exchanger unit tube length ($L_{OD}$), an indoor heat exchanger unit tube length ($L_{ID}$), and a liquid line tube length ($L_{LL}$);

a memory device for storing the first temperature ($T_1$), the second temperature ($T_2$), the refrigerant type, the expansion device type, the cycle mode, the outdoor heat exchanger unit tube diameter ($D_{OD}$), the indoor heat exchanger unit tube diameter ($D_{ID}$), the liquid line tube diameter ($D_{LL}$), the outdoor heat exchanger unit tube length ($L_{OD}$), the indoor heat exchanger unit tube length ($L_{ID}$), and the liquid line tube length ($L_{LL}$) from said input device;

a processing device for determining a subcooling temperature ($\Delta T_{SC}$) in degrees Kelvin according to the equation $\Delta T_{SC}=T_1-T_2$, determining an optimum refrigerant charge value (ORC) in pounds from the outdoor heat exchanger unit tube diameter ($D_{OD}$), the indoor heat exchanger unit tube diameter ($D_{ID}$), the liquid line tube diameter ($D_{LL}$), the outdoor heat exchanger unit tube length ($L_{OD}$), the indoor heat exchanger unit tube length ($L_{ID}$), and the liquid line tube length ($L_{LL}$) according to the equation ORC (lb)=$a_1\times L_{OD}\times(D_{OD}-0.024)^2+a_2\times L_{ID}\times(D_{ID}-0.024)^2+a_3\times L_{LL}\times(D_{LL}-0.064)^2$ where coefficients $a_1$, $a_2$ and $a_3$ are selected from Table 1 and, according to the refrigerant type, determining the ratio ($RC_p$) of the actual refrigerant charge level (ARC) (lb) to the optimized refrigerant charge level (ORC) (lb) according to the equation $(RC_p)=(ARC)/(ORC)=f_1\times\Delta T^4_{SC}+f_2\times\Delta T^3_{SC}+f_3\times\Delta T^2_{SC}+f_4\times\Delta T_{SC}+f_5$ where coefficients $f_1$, $f_2$, $f_3$, $f_4$ and $f_5$ are selected from Table 2, according to the expansion device type, the cycle mode, and ($\Delta T_{SC}$), determining the actual refrigerant charge level (ARC) (lb) in the HVAC system according to the equation ARC (lb)=$RC_p\times$ORC (lb), determining the amount of refrigerant charge to add ($\Delta$RC) (lb) according to the equation $\Delta$RC (lb)=ORC(lb)−ARC (lb); and a display device for displaying one or more of the actual refrigerant charge level (ARC) (lb), the optimum refrigerant charge level (ORC)(lb) and the refrigerant charge to be added ($\Delta$RC) (lb).

* * * * *

UNITED STATES PATENT AND TRADEMARK OFFICE
CERTIFICATE OF CORRECTION

PATENT NO. : 9,726,410 B2
APPLICATION NO. : 14/828595
DATED : August 8, 2017
INVENTOR(S) : Zhiming Gao, Omar Abdelaziz and Tim J. LaClair It is certified that error appears in the above-identified patent and that said Letters Patent is hereby corrected as shown below:

On the Title Page

(72) Inventors: The inventor whose name reads "Tim L. LaClair" should read "Tim J. LaClair".

Signed and Sealed this
Ninth Day of January, 2018

Joseph Matal
*Performing the Functions and Duties of the
Under Secretary of Commerce for Intellectual Property and
Director of the United States Patent and Trademark Office*